Patented Sept. 6, 1932

1,876,122

UNITED STATES PATENT OFFICE

GEORGE B. WOOD, OF ROCKLAND, MAINE, ASSIGNOR TO ROCKLAND & ROCKPORT LIME CORPORATION, OF ROCKLAND, MAINE, A CORPORATION OF MAINE

PREMIXED PRODUCT FOR PLASTER FINISHING COATS

No Drawing. Application filed May 2, 1930. Serial No. 449,358.

In the manufacture of finish coats for plastered walls or ceilings, especially where a hard white finish is desired, certain materials have been accepted as standard but while of general efficiency have involved certain difficulties in use.

The object of the present invention is to overcome these difficulties while retaining the desired features proven satisfactory in previous practice. In such mixtures slaked lime putty is highly desirable to give the product sufficient plasticity so as to make it readily workable in being applied to the surface and bringing it to a smooth and even condition.

In order to provide for rapidity of set in such material, plaster of Paris has usually been employed and has been found of advantage in getting a quick setting to avoid the development of cracks due to shrinkage in drying.

In addition to the above materials, the use of some inert material such as fine beach sand or marble dust, reduces the labor of troweling and with a lesser amount of plaster of Paris gives a coat less liable to develop shrinkage cracks and produces a more enduring and harder surface for the coating. Such an aggregate therefore is recognized by the plastering trade as very desirable, but is not always available.

In producing these mixed plastering materials lime putty must first be prepared at the plastering job by the soaking of hydrated lime or the slaking of quick lime with water. Since plaster of Paris sets very rapidly it must be added to the lime putty in the mixture of small batches prepared for immediate use on the work. If sand or marble dust is used it may be added to the lime putty at the time of slaking quick lime, but a great deal of care and additional labor cost is necessary to accomplish the necessary uniform mixture of sand and lime putty. To obtain the desired uniform quantity and thorough mixing of such aggregate in the plaster mixture, the usual practice is to measure and add such aggregate to small batches of lime putty at the same time the plaster of Paris is added. The additional labor cost of providing three separate materials and their accurate proportioning and mixing in small batches, often precludes the use of any aggregate even where such good materials as fine sand or marble dust are readily available.

I therefore contemplate the preparation of a pre-mixed coating involving the usual ingredients, lime and an aggregate, so that the product is ready for use by the plasterer with the most desirable characteristics regardless of the resources of the locality in which he is working.

The preparation of such a product involves certain difficulties first in maintaining the intimacy of the mixture, and again in providing the materials of such a nature that they may be mixed by the workman with a minimum tendency of burning during the slaking process and thus losing the desired qualities of plasticity and workability.

Quick lime as ordinarily supplied either in bulk or packed in barrels is in the form of lumps, varying in size from small particles to pieces as large as six inches in diameter. Hydrated lime is an extremely finely divided flocculent powder. Obviously it is not possible to prepare an intimate mixture of lime in these forms with material such as fine sand or finely crushed marble or limestone and avoid the segregation of the two materials. Such segregation of the lime and the aggregate will occur both during shipment of the dry mixed materials to destination and during the slaking or mixing of the same with water on the plastering job.

These difficulties are avoided and the desired results attained in accordance with my invention by providing the materials for the mixture, notably lime and the aggregate, in particles of such similar ponderance that there is no tendency of the ingredients to separate by gravity and thus lose the intimacy of the mixture. For example, I contemplate using a pulverized or fine granular quick lime of such size as to approximate the ponderance of sand grains or particles of marble dust or ground limestone used as the aggregate.

In working up such material the presence of the aggregate is of great advantage during the slaking of the pulverized lime. During such slaking it is necessary for the workman to maintain an excess of water and to work the batch vigorously in order to avoid burning. However, with my mixture the inert aggregate by its absorption of the generated heat, tempers and slows up the slaking action and therefore lessens the likelihood of burning so that the mixing is facilitated and the high quality of the ultimate product is assured.

In accordance with the practice previously described plaster of Paris is employed as a setting agent and as this is an expensive ingredient and one in which the setting action is definite, the mixture must be provided in such condition that no one of the ingredients will unfavorably react with any of the others.

In most of these finishes whiteness in the coating is extremely desirable if not absolutely demanded. For such finishes I employ as an aggregate marble dust or white limestone which is available in certain places in white crystalline form.

In preparing the marble or limestone, however, care must be taken to maintain uniformity of the set of the plaster of Paris as the marble or limestone if in too fine a form affects the set of the plaster of Paris. I have found, however, that by keeping the aggregate coarser than 100 mesh or by eliminating particles finer than 100 mesh, no undersirable effect is experienced. That is to say my aggregate will not act as a stucco retardant in the plaster mix. According to my invention a minimum amount of plaster of Paris may be employed in the finish on the wall so that an actual saving is experienced in this expensive factor of the material.

As characteristic of my invention I will cite the following mixtures which constitute finishes of high quality and are capable of being pre-mixed and supplied to the workman at a great saving of time in preparing and applying the coating and with a more definite assurance as to the uniformity and quality of the mixture than where the individual workman is permitted to mix the finish with less accurate proportioning of the ingredients.

*For lime skim finish coat*

| | |
|---|---|
| Pulverized or fine granular quick lime of a size to pass through a 30 mesh screen | 50 lbs. |
| Beach sand of approximately the same fineness | 50 lbs. |
| | 100 lbs. |

*For hard white finish coat*

| | |
|---|---|
| Pulverized or fine granular quick lime of a size to pass through a 30 mesh screen | 70 lbs. |
| Crushed marble or white limestone of a size to pass through a 30 mesh screen and having all the material finer than 100 mesh removed | 30 lbs. |
| | 100 lbs. |

By my invention these mixtures would be prepared at the manufacturing plant. Marble chips or white limestone would be ground in standard grinding machinery to a fineness where all of the material would pass through a screen of about 30 meshes to the linear inch and re-screening or air separating would remove all of the crushed material finer than 100 mesh.

Fine beach sand, marble dust or other aggregate would be dried in a mechanical drier at the manufacturing plant so as to be entirely free from moisture, providing a material best suited for intimate mixture with the quick lime and avoiding the deterioration of the quick lime which would result from the presence of moisture. Quick lime would be pulverized or granulated to the desired size of particles and intimately mixed with the aggregate in a mechanical mixer at the manufacturing plant. The finished mixture would be packed in specially prepared air-proof and waterproof paper bags of size or weight most acceptable to the plastering trade. As the pre-mixture is standard and uniform definite instructions as to the preparation and the use of the material may be supplied with the product.

My product not only produces a superior surface coat at a less labor cost in application, but by using the relatively inexpensive aggregates as above indicated effects a proportionate saving in the amount of the lime and the plaster of Paris actually used in the body of the coat.

What I therefore claim and desire to secure by Letters Patent is:—

1. A pre-mixed plaster finish product consisting of comminuted quick lime, and a granular aggregate of above 100 mesh size, said lime comprising particles of size substantially to equal the weight of the grains of the aggregate.

2. A pre-mixed plaster finish including comminuted quick lime and a granular aggregate, the quick lime particles being of such ponderance as substantially to equal in weight the particles of the inert material whereby relative distribution is maintained in the mixture.

3. A plaster finish including comminuted quick lime and particles of white crystalline limestone, the quick lime particles being of such ponderance as substantialy to equal in weight the particles of the crystalline limestone and all intimately mixed.

In testimony whereof I affix my signature.

GEORGE B. WOOD.